Sept. 7, 1954  N. O. KRENKE  2,688,518
PNEUMATIC CONVEYING SYSTEM
Filed Aug. 27, 1952
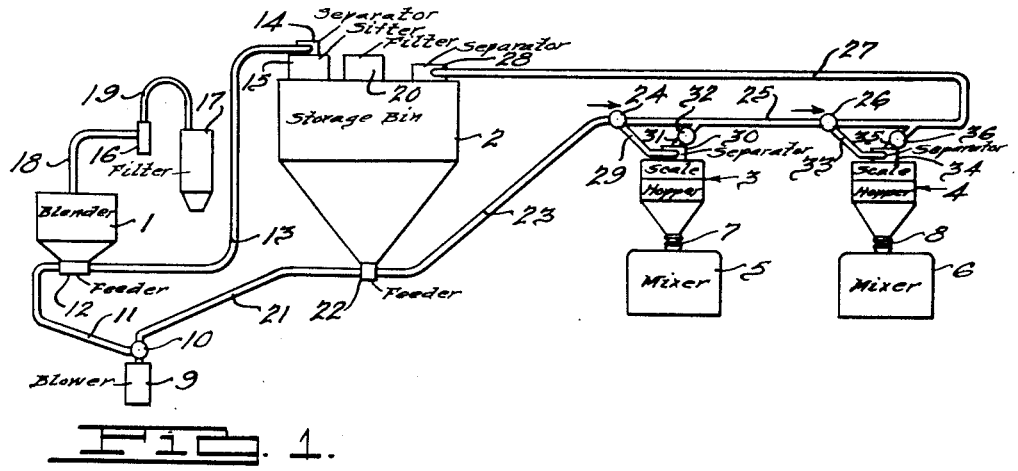
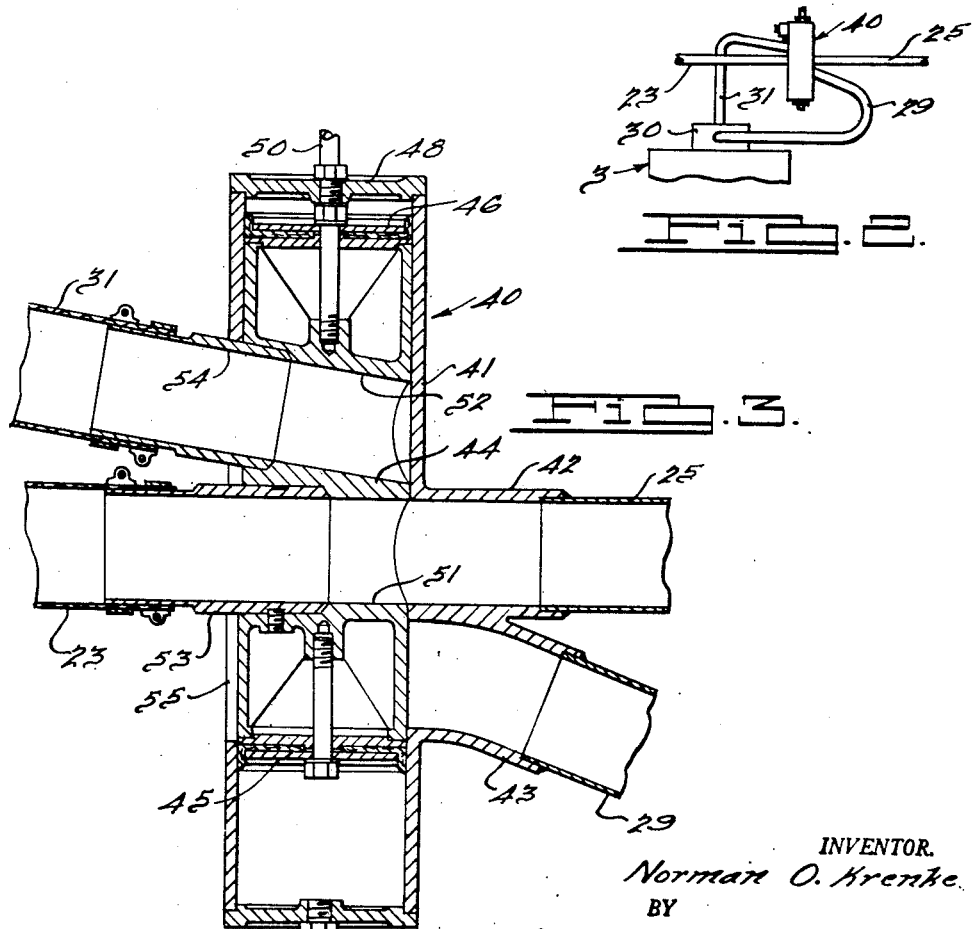
INVENTOR.
Norman O. Krenke
BY
Harness, Dickey & Pierce
ATTORNEYS.

Patented Sept. 7, 1954

2,688,518

UNITED STATES PATENT OFFICE 2,688,518

PNEUMATIC CONVEYING SYSTEM

Norman O. Krenke, Saginaw, Mich., assignor to Baker Perkins Inc., Saginaw, Mich., a corporation of New York Application August 27, 1952, Serial No. 306,696

12 Claims. (Cl. 302—28)

The present invention relates to pneumatic conveying systems and constitutes an improvement on the type of conveying system for flour and similar materials disclosed in the copending application of Albert O. Riordan, Serial No. 291,837 filed June 5, 1952.

In the system disclosed in the above-mentioned Riordan application, flour or other similar material may be conveyed from a bin or other starting point through a main pneumatic conveying conduit to any one of a plurality of hoppers, in which the product is weighed. The main conduit is in the form of a closed loop which returns to the bin; and each of the scale hoppers may be connected to the conveyor by a diverter valve in the main conveying conduit. When a scale hopper receives the desired quantity of flour, the diverter valve is shifted to its straight-through position and the feed of flour to the inlet end of the conveyor conduit is terminated, but the flow of conveying air is continued for the purpose of returning any flour in the conduit to the bin through the return loop. The air discharged from the hopper is exhausted through a special dust-collecting conduit. One advantage of the Riordan system lies in the fact that it is not necessary to provide a highly efficient separator at the destination, since failure of the separator to effect a complete separation of flour and air will not introduce any errors in the weighed quantity delivered to the hopper.

It is one of the objects of the present invention to improve and simplify the above-described Riordan system by eliminating the dust-collecting conduit and associated suction pumps and dust separators, which are costly and occupy considerable space.

Another object is to provide a conveying system in which there is even less need for complete separation of flour and air at the scale hopper than is the case in the Riordan system.

Other objects and advantages of the invention will become apparent from the following specification, the accompanying drawings, and the appended claims.

In the drawings:

Figure 1 is a diagrammatic view of a relatively simple example of the improved conveying system in which means are provided for selectively delivering flour to either one of two scale hoppers;

Figure 2 is a fragmentary view of a modification of the system shown in Figure 1; and Figure 3 is an enlarged sectional view of the diverter valve employed in the modified system of Figure 2.

The system illustrated in Figure 1 includes a single storage bin, means for loading the bin, and means for discharging flour from the bin to either one of two mixers. In loading the bin, flour from sacks or any other source is dumped into a blender 1, from which it is conveyed to the storage bin 2. From this bin, flour may be conveyed selectively to either one of a pair of flour scales 3 and 4 mounted, respectively, over dough mixers 5 and 6. Suitable shut-off valves 7 and 8 are provided between the weighing scales and the mixers for use in discharging the contents of the scales into the mixers after the desired quantity of flour has been delivered.

The conveying system for bin loading includes a positive displacement compressor or blower 9, which preferably is of the Root's type and which supplies air under pressure to a three-way valve 10, which is adjustable between two positions. For bin loading, the valve 10 is so adjusted that it connects the blower to a conveying conduit 11, which supplies air to a motor-driven paddle-wheel type feeder 12, which delivers flour to the current of air flowing between the conduit 11 and the feeder discharge conduit 13. Any suitable form of feeder may be employed for this purpose, suitable types being disclosed, for example, in the patents to Rieth No. 717,926 and Colburn No. 2,550,781. The flour is conveyed by the air current through the conduit 13 and discharges tangentially into an air separator 14, which is simply a relatively low cylindrical housing having a coverplate. The bottom of the cylindrical housing is open and permits the flour to fall by gravity into a motor-driven sifter 15, which is positioned on top of the storage bin and discharges the sifted flour by gravity into the bin. The storage bin preferably is provided with a motor-driven leveling bar of conventional construction. This bar, which is not illustrated in the drawings, is rotatable on a vertical axis and is positioned near the top of the bin, so that it will distribute flour evenly and permit complete filling of the bin.

In order to collect and remove fine dust which results from the emptying of flour sacks in the blender 1, there is provided a small, motor-driven centrifugal separator 16, preferably of the type known in the trade as a "Roto-Clone" separator. The separator 16 discharges into an air filter 17. The separator 16 acts as a suction fan, drawing air from the blender through conduit 18 and discharging air from which most of the entrained flour has been removed through a conduit 19 to the filter 17. Thus, the flour removed from the air drawn from the blender through conduit 18 is collected in part in a collection chamber in the separator 16 and in part in the air filter 17.

When it is desired to discharge flour from bin 2 to either of the scale hoppers, the three-way valve 10 is shifted to connect the motor-driven blower 9 to the conduit 21, which supplies air under pressure to a bin discharge feeder 22, similar in construction to the previously described feeder 12. The flour-laden air leaves the feeder 22 through a main conveying conduit 23, which extends past and closely adjacent to the flour scales 3 and 4. A pair of three-way valves 24 and 26 is provided in the conduit 23 adjacent the scale hoppers 3 and 4, and the valves operate in one position to connect the main conduit 23 to branch conduits 29 and 33, respectively. Branch conduit 29 discharges tangentially into a separator 30, similar in construction to the previously described separator 14 except that its coverplate is provided with an axial air discharge opening to which is connected a discharge conduit 31 containing a check valve 32. The discharge conduit is connected to the main conveying conduit and, consequently, the air from the separator 30 is returned to the main conduit, through which it flows to the storage bin 2. The check valve 32 may be of conventional construction, and preferably is simply a flap-type valve which permits flow from the separator 30 to the main conduit 25 but blocks flow in the opposite direction.

The branch conduit 33 discharges tangentially into a similar separator 34 positioned on top of the scale 4. The outlet from the separator 34 likewise is connected to the main conveying conduit 27 by a conduit 35 containing a check valve 36 which operates to block flow from the main conduit through the conduit 35 to the separator 34. The branch conduits 29 and 33 and the air discharge conduits 31 and 35 preferably are made of flexible material, so that they will not interfere with the operation of the weighing scales. The return main conveying conduit 27 is connected to a separator 28 mounted on top of the storage bin 2, the construction of separator 28 being identical to that of separator 14.

It will be observed that the system above-described differs from that of the previously mentioned Riordan system in that the separators 30 and 34 at the scale hoppers have their air discharge outlets connected directly to the return loop of the main conveying conduit, instead of being connected to a separate dust-collecting suction conduit which, in turn, must be connected to a relatively large centrifugal separator and filter similar to the small separator and filter 16 and 17, previously described. The system also differs in that neither the storage bin nor the separators 14 and 28 on the storage bin have air discharge outlets connected to a dust-collecting system; but, in lieu thereof, air is discharged through a filter 20 into the atmosphere. This filter is mounted on the bin, itself; but, if desired, separate filter outlets could be provided on each separator. As a result of these changes, it will be noted that all portions of the system of the present invention operate under a positive air pressure; i. e., the scale hoppers, the separators 30 and 34, the air discharge conduits 31 and 35, the return loop 27 and the storage bin 2 all are under a positive air pressure supplied by the blower 9, and the air delivered by the blower not only delivers flour from the storage bin to the diverter valves 24 and 26 but also operates to return to the storage bin any residual flour not separated from the conveying air by the separators 30 and 34.

The use of a blower at the air inlet end of the conveyer permits the use of a blower of smaller volumetric capacity, smaller tubing and a higher ratio of flour to air, all of which are advantageous. However, many of the advantages of the invention may be realized by positioning the blower on the air outlet from the bin, thus operating the system as a suction system. In that case, valve 10 may be replaced by a pair of shut-off valves, one each for conduits 11 and 21, which will open these conduits to atmosphere.

After the delivery of flour to either of the scale hoppers is completed and the diverter valve associated with that scale hopper is returned to its straight-through position, the operation of the feeder 22 is stopped and the blower 9 continues to blow air through the main conveyer conduit until all flour therein is cleared. Thus, each delivery operation starts with conduits completely cleared of flour. It will be noted that it is unnecessary for the separators 30 and 34 to effect complete separation of air and flour because only the separated flour is weighed and any unseparated flour which is discharged through conduits 31 and 35 is simply returned to the storage bin. As a result, the separators may be of very simple and rudimentary construction low in cost, and, therefore, may occupy very little space or headroom.

Except as above indicated, all of the elements of the system disclosed in Figure 1 may be identical to the corresponding elements in the system disclosed in Figure 1 of the aforementioned Riordan application. Moreover, the automatic electrical control circuit disclosed in Figure 3 of said Riordan application may be employed to operate the system of the present application. The only change which need be made in the control circuit of the Riordan application is to eliminate those portions of the circuit relating to the "Roto-Clone" separator, in which event the "Roto-Clone" separator 16 of the present invention may be manually started and stopped independently of the main electrical control circuit.

In Figure 2 is illustrated fragmentarily a modified form of the invention, in which a single composite valve is employed in lieu of the diverter valve and the check valve associated with each scale hopper. Only that portion of the system associated with one of the scale hoppers is illustrated, but it will be understood that the mechanism associated with each scale hopper will be similar and that the remaining portions of the system will be the same as those illustrated in Figure 1. Thus, as shown in Figure 2, the main conveying conduit 23—25 has positioned therein a diverter valve 40. The branch conduit 29, which delivers flour and air to the separator 30 on scale 3, also is connected to the diverter valve 40, as is the air discharge conduit 31, which extends from the separator 30 to the valve. As hereinafter set forth, the construction of valve 40 is such that in one position it connects the main conveynig conduit sections 23—25 and blocks the branch conduit 29 and the air discharge conduit 31. In its other position, valve 40 connects the main conduit section 23 to the branch conduit 29 and at the same time connects the air discharge conduit 31 to the main conveyer conduit section 25, thus diverting flour and air to the separator 30 and returning the air discharged from the separator to the main conveying conduit at a point beyond the valve.

The construction of valve 40 is illustrated in greater detail in Figure 3. As there shown, the valve comprises a stationary housing 41 having a pair of discharge ports 42 and 43, the discharge port 42 being connected to the main conveying conduit section 25 and the discharge port 43 being connected to the flexible branch conduit 29. The housing 41 is generally in the form of a cylinder extending at right angles to the port 42. A generally cylindrical valve element 44 is slidable within the cylindrical housing and is equipped with a pair of pistons 45 and 46, by means of which it may be actuated. The ends of the cylinder 41 are closed by cylinder heads 47 and 48 equipped with air control conduits 49 and 50, through which air under pressure may be supplied or discharged for the purpose of shifting the valve element 44 from one end of the cylinder to the other. The conduits 49 and 50 may be controlled by any conventional form of four-way air valve, preferably a solenoid-operated valve of the type described in the aforementioned Riordan application for operating the diverter valves therein disclosed.

The movable valve element 44 has a pair of ports 51 and 52 extending therethrough. A flexible section of the main conveying conduit 23 is connected to the port 51 by means of a sleeve 53; and the flexible air return conduit 31 is connected by means of a sleeve 54 to the port 52. The wall of the valve housing 41 is provided with an opening 55 at one side to permit movement of the sleeves 53 and 54 and associated conduits axially with reference to the valve housing.

It will be observed that when the parts are in the position shown in Figure 3, the port 51 in the valve element 44 connects the main conveying conduit 23 to the main conveying conduit section 25 and blocks the branch conduit 29 and the air discharge conduit 31. However, when air under pressure is supplied through the pipe line 50 and air is exhausted from pipe 49, the valve element will shift downwardly, as viewed in Figure 3, thus placing port 51 in communication with port 43 of the valve housing and at the same time placing port 52 in communication with port 42 of the valve housing. In that position, therefore, flour and air entering from the main conduit section 23 flow into the branch conduit 29 and the air discharging through conduit 31 returns to the main conveying conduit section 25. It will be observed that valve 40 thus performs the combined functions of the valves 24 and 32 in the form of invention shown in Figure 1. Consequently, no check valve is required in the air discharge conduit.

While only two forms of the invention are illustrated and described, it will be understood that other variations in the principles of the systems herein disclosed may be indulged in without departing from the spirit of the invention or the scope of the appended claims. Thus, for example, the application of Applicant's improvement to the basic closed loop system of the aforementioned Riordan application may be employed in any form of system embodying a main conveying conduit in the form of a closed loop, regardless of the number of starting points or storage bins and regardless of the number of destinations or scale hoppers.

What is claimed is:

1. A pneumatic conveying system for delivering bulk flour or like material from a container to a remote destination, including a container from which the material may be drawn, a receptacle at the remote destination for receiving the conveyed material and the conveying air, a main conveying conduit extending in a closed loop from its inlet end at the container past said receptacle in close proximity thereto and returning to the container at its discharge end, means including a diverter valve in the main conduit adjacent the receptacle operative when the valve is in its diverting position to divert material from the main conduit into the receptacle and in its straight-through position to block communication between the main conduit and the receptacle and permit flow through the main conduit, means forming an air discharge passage connecting the receptacle to said main conveying conduit at a point beyond said diverter valve, means for blowing air through the main conduit, means for feeding material from the container into the main conduit at its inlet end for delivery by the air flowing therethrough into said receptacle when said valve is in its diverting position, said discharge passage being effective to return to the container by way of the remainder of the main conduit the air discharged by said receptacle, and means for exhausting air from the container free of conveyed material.

2. A pneumatic conveying system for delivering bulk flour or like material from a container to a remote destination, including a container from which the material may be drawn, a receptacle at the remote destination for receiving the conveyed material and the conveying air, a main conveying conduit extending in a closed loop from its inlet end at the container past said receptacle in close proximity thereto and returning to the container at its discharge end, means including a diverter valve in the main conduit adjacent the receptacle operative when the valve is in its diverting position to divert material from the main conduit into the receptacle and in its straight-through position to block communication between the main conduit and the receptacle and permit flow through the main conduit, means forming an air discharge passage connecting the receptacle to said main conveying conduit at a point beyond said diverter valve, means for blowing air through the main conduit, means for feeding material from the container into the main conduit at its inlet end for delivery by the air flowing therethrough into said receptacle when said valve is in its diverting position, said discharge passage being effective to return to the container by way of the remainder of the main conduit the air discharged by said receptacle, means for exhausting air from the container free of conveyed material, means operable while material is being conveyed to said receptacle to shift said diverter valve to its straight-through position and thus terminate delivery of material to said receptacle, and means for stopping the feed of material to the main conduit in order to permit the air blowing means to clear the main conduit by returning the material therein to the container after the diverter valve is returned to its straight-through position.

3. A pneumatic conveying system for delivering bulk flour or like material from a container to a remote destination, including a container from which the material may be drawn, a receptacle at the remote destination for receiving the conveyed material and the conveying air, a main conveying conduit extending in a closed loop from its inlet end at the container past said receptacle in close proximity thereto and returning to the container at its discharge end, means including a diverter valve in the main conduit adjacent the receptacle operative when the valve is in its diverting position to divert material from the main conduit into the receptacle and in its straight-through position to block communication between the main conduit and the receptacle and permit flow through the main conduit, means forming an air discharge passage connecting the receptacle to said main conveying conduit at a point beyond said diverter valve, means for preventing flow from the main conduit to the receptacle through the discharge passage when the diverter valve is in its straight-through position, means for blowing air through the main conduit, means for feeding material from the container into the main conduit at its inlet end for delivery by the air flowing therethrough into said receptacle when said valve is in its diverting position, said discharge passage being effective to return to the container by way of the remainder of the main conduit the air discharged by said receptacle, and means for exhausting air from the container free of conveyed material.

4. A pneumatic conveying system for delivering bulk flour or like material from a container to a remote destination, including a container from which the material may be drawn, a receptacle at the remote destination for receiving the conveyed material and the conveying air, a main conveying conduit extending in a closed loop from its inlet end at the container past said receptacle in close proximity thereto and returning to the container at its discharge end, means including a diverter valve in the main conduit adjacent the receptacle operative when the valve is in its diverting position to divert material from the main conduit into the receptacle and in its straight-through position to block communication between the main conduit and the receptacle and permit flow through the main conduit, means forming an air discharge passage connecting the receptacle to said main conveying conduit at a point beyond said diverter valve, means for preventing flow from the main conduit to the receptacle through the discharge passage when the diverter valve is in its straight-through position, means for blowing air through the main conduit, means for feeding material from the container into the main conduit at its inlet end for delivery by the air flowing therethrough into said receptacle when said valve is in its diverting position, said discharge passage being effective to return to the container by way of the remainder of the main conduit the air discharged by said receptacle, means for exhausting air from the container free of conveyed material, means operable while material is being conveyed to said receptacle to shift said diverter valve to its straight-through position and thus terminate delivery of material to said receptacle, and means for stopping the feed of material to the main conduit in order to permit the air blowing means to clear the main conduit by returning the material therein to the container after the diverter valve is returned to its straight-through position.

5. A pneumatic conveying system for delivering bulk flour or like material from a container to a remote destination, including a container from which the material may be drawn, a receptacle at the remote destination for receiving the conveyed material and the conveying air, a main conveying conduit extending in a closed loop from its inlet end at the container past said receptacle in close proximity thereto and returning to the container at its discharge end, means including a diverter valve in the main conduit adjacent the receptacle operative when the valve is in its diverting position to divert material from the main conduit into the receptacle and in its straight-through position to block communication between the main conduit and the receptacle and permit flow through the main conduit, means forming an air discharge passage connecting the receptacle to said main conveying conduit at a point beyond said diverter valve, a check valve in said discharge passage for preventing reverse flow therein, means for blowing air through the main conduit, means for feeding material from the container into the main conduit at its inlet end for delivery by the air flowing therethrough into said receptacle when said valve is in its diverting position, said discharge passage being effective to return to the container by way of the remainder of the main conduit the air discharged by said receptacle, and means for exhausting air from the container free of conveyed material.

6. A pneumatic conveying system for delivering bulk flour or like material from a container to a remote destination, including a container from which the material may be drawn, a receptacle at the remote destination for receiving the conveyed material and the conveying air, a main conveying conduit extending in a closed loop from its inlet end at the container past said receptacle in close proximity thereto and returning to the container at its discharge end, means including a diverter valve in the main conduit adjacent the receptacle operative when the valve is in its diverting position to divert material from the main conduit into the receptacle and in its straight-through position to block communication between the main conduit and the receptacle and permit flow through the main conduit, means forming an air discharge passage connecting the receptacle to said main conveying conduit at a point beyond said diverter valve, a check valve in said discharge passage for preventing reverse flow therein, means for blowing air through the main conduit, means for feeding material from the container into the main conduit at its inlet end for delivery by the air flowing therethrough into said receptacle when said valve is in its diverting position, said discharge passage being effective to return to the container by way of the remainder of the main conduit the air discharged by said receptacle, means for exhausting air from the container free of conveyed material, means operable while material is being conveyed to said receptacle to shift said diverter valve to its straight-through position and thus terminate delivery of material to said receptacle, and means for stopping the feed of material to the main conduit in order to permit the air blowing means to clear the main conduit by returning the material therein to the container after the diverter valve is returned to its straight-through position.

7. A pneumatic conveying system for delivering bulk flour or like material from a container to any one of a plurality of remote destinations, including a container from which the material may be drawn, a receptacle at each remote destination for receiving the conveyed material and the conveying air, a main conveying conduit extending in a closed loop from its inlet end at the container past said receptacles in close proximity thereto and returning to the container at its discharge end, means including a diverter valve in the main conduit adjacent each receptacle operative when the valve is in its diverting position to divert material from the main conduit into the associated receptacle and in its straight-through position to block communication between the main conduit and the receptacle and permit flow through the main conduit, means forming a separate air discharge passage connecting each receptacle to said main conveying conduit at a point beyond the associated diverter valve, means for blowing air through the main conduit, means for feeding material from the container into the main conduit at its inlet end for delivery by the air flowing therethrough into one of said receptacles when its diverter valve is in its diverting position, said discharge passage being effective to return to the container by way of the remainder of the main conduit the air discharged by said receptacle, and means for exhausting air from the container free of conveyed material.

8. A pneumatic conveying system for delivering bulk flour or like material from a container to any one of a plurality of remote destinations, including a container from which the material may be drawn, a receptacle at each remote destination for receiving the conveyed material and the conveying air, a main conveying conduit extending in a closed loop from its inlet end at the container past said receptacles in close proximity thereto and returning to the container at its discharge end, means including a diverter valve in the main conduit adjacent each receptacle operative when the valve is in its diverting position to divert material from the main conduit into the associated receptacle and in its straight-through position to block communication between the main conduit and the receptacle and permit flow through the main conduit, means forming a separate air discharge passage connecting each receptacle to said main conveying conduit at a point beyond the associated diverter valve, means for blowing air through the main conduit, means for feeding material from the container into the main conduit at its inlet end for delivery by the air flowing therethrough into one of said receptacles when its diverter valve is in its diverting position, said discharge passage being effective to return to the container by way of the remainder of the main conduit the air discharged by said receptacle, means for exhausting air from the container free of conveyed material, means operable while material is being conveyed to one of said receptacles to shift said diverter valve to its straight-through position and thus terminate delivery of material to said receptacle, and means for stopping the feed of material to the main conduit in order to permit the air blowing means to clear the main conduit by returning the material therein to the container after the diverter valve is returned to its straight-through position.

9. A pneumatic conveying system for delivering bulk flour or like material from a container to any one of a plurality of remote destinations, including a container from which the material may be drawn, a receptacle at each remote destination for receiving the conveyed material and the conveying air, a main conveying conduit extending in a closed loop from its inlet end at the container past said receptacles in close proximity thereto and returning to the container at its discharge end, means including a diverter valve in the main conduit adjacent each receptacle operative when the valve is in its diverting position to divert material from the main conduit into the associated receptacle and in its straight-through position to block communication between the main conduit and the receptacle and permit flow through the main conduit, means forming a separate air discharge passage connecting each receptacle to said main conveying conduit at a point beyond the associated diverter valve, means for preventing flow from the main conduit to any receptacle through the associated discharge passage when the associated diverter valve is in its straight-through position, means for blowing air through the main conduit, means for feeding material from the container into the main conduit at its inlet end for delivery by the air flowing therethrough into one of said receptacles when its diverter valve is in its diverting position, said discharge passage being effective to return to the container by way of the remainder of the main conduit the air discharged by said receptacle, and means for exhausting air from the container free of conveyed material.

10. A pneumatic conveying system for delivering bulk flour or like material from a container to any one of a plurality of remote destinations, including a container from which the material may be drawn, a receptacle at each remote destination for receiving the conveyed material and the conveying air, a main conveying conduit extending in a closed loop from its inlet end at the container past said receptacles in close proximity thereto and returning to the container at its discharge end, means including a diverter valve in the main conduit adjacent each receptacle operative when the valve is in its diverting position to divert material from the main conduit into the associated receptacle and in its straight-through position to block communication between the main conduit and the receptacle and permit flow through the main conduit, means forming a separate air discharge passage connecting each receptacle to said main conveying conduit at a point beyond the associated diverter valve, means for preventing flow from the main conduit to any receptacle through the associated discharge passage when the associated diverter valve is in its straight-through position, means for blowing air through the main conduit, means for feeding material from the container into the main conduit at its inlet end for delivery by the air flowing therethrough into one of said receptacles when its diverter valve is in its diverting position, said discharge passage being effective to return to the container by way of the remainder of the main conduit the air discharged by said receptacle, means for exhausting air from the container free of conveyed material, means operable while material is being conveyed to one of said receptacles to shift said diverter valve to its straight-through position and thus terminate delivery of material to said receptacle, and means for stopping the feed of material to the main conduit in order to permit the air blowing means to clear the main conduit by returning the material therein to the container after the diverter valve is returned to its straight-through position.

11. A pneumatic conveying system for delivering bulk flour or like material from a container to any one of a plurality of remote destinations, including a container from which the material may be drawn, a receptacle at each remote destination for receiving the conveyed material and the conveying air, a main conveying conduit extending in a closed loop from its inlet end at the container past said receptacles in close proximity thereto and returning to the container at its discharge end, means including a diverter valve in the main conduit adjacent each receptacle operative when the valve is in its diverting position to divert material from the main conduit into the associated receptacle and in its straight-through position to block communication between the main conduit and the receptacle and permit flow through the main conduit, means forming a separate air discharge passage connecting each receptacle to said main conveying conduit at a point beyond the associated diverter valve, a check valve in each discharge passage for preventing reverse flow therein, means for blowing air through the main conduit, means for feeding material from the container into the main conduit at its inlet end for delivery by the air flowing therethrough into one of said receptacles when its diverter valve is in its diverting position, said discharge passage being effective to return to the container by way of the remainder of the main conduit the air discharged by said receptacle, and means for exhausting air from the container free of conveyed material.

12. A pneumatic conveying system for delivering bulk flour or like material from a container to any one of a plurality of remote destinations, including a container from which the material may be drawn, a receptacle at each remote destination for receiving the conveyed material and the conveying air, a main conveying conduit extending in a closed loop from its inlet end at the container past said receptacles in close proximity thereto and returning to the container at its discharge end, means including a diverter valve in the main conduit adjacent each receptacle operative when the valve is in its diverting position to divert material from the main conduit into the associated receptacle and in its straight-through position to block communication between the main conduit and the receptacle and permit flow through the main conduit, means forming a separate air discharge passage connecting each receptacle to said main conveying conduit at a point beyond the associated diverter valve, a check valve in each discharge passage for preventing reverse flow therein, means for blowing air through the main conduit, means for feeding material from the container into the main conduit at its inlet end for delivery by the air flowing therethrough into one of said receptacles when its diverter valve is in its diverting position, said discharge passage being effective to return to the container by way of the remainder of the main conduit the air discharged by said receptacle, means for exhausting air from the container free of conveyed material, means operable while material is being conveyed to one of said receptacles to shift said diverter valve to its straight-through position and thus terminate delivery of material to said receptacle, and means for stopping the feed of material to the main conduit in order to permit the air blowing means to clear the main conduit by returning the material therein to the container after the diverter valve is returned to its straight-through position.

References Cited in the file of this patent

UNITED STATES PATENTS

| Number | Name | Date |
|---|---|---|
| 1,248,851 | Heisler | Dec. 4, 1917 |
| 1,308,369 | Renkin | July 1, 1919 |
| 2,580,581 | Niemitz | Jan. 1, 1952 |